(12) United States Patent
Clements et al.

(10) Patent No.: US 11,804,789 B2
(45) Date of Patent: Oct. 31, 2023

(54) SYSTEM AND METHOD FOR PROTECTING AN ELECTRICAL LOAD OF A DRIVE SYSTEM

(71) Applicant: Siemens Aktiengesellschaft, Munich (DE)

(72) Inventors: Neal Clements, Lower Burrell, PA (US); Daniel Grasinger, Saltsburg, PA (US); Elena V Koneva, Monroeville, PA (US); John Channing Bousfield, III, Murrysville, PA (US)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 17/416,866

(22) PCT Filed: Feb. 20, 2020

(86) PCT No.: PCT/US2020/018987
§ 371 (c)(1),
(2) Date: Jun. 21, 2021

(87) PCT Pub. No.: WO2020/172376
PCT Pub. Date: Aug. 27, 2020

(65) Prior Publication Data
US 2022/0085713 A1 Mar. 17, 2022

Related U.S. Application Data (60) Provisional application No. 62/808,412, filed on Feb. 21, 2019.

(51) Int. Cl.
*H02M 7/49* (2007.01)
*H02M 1/32* (2007.01)
*H02M 7/483* (2007.01)

(52) U.S. Cl.
CPC ............... *H02M 7/49* (2013.01); *H02M 1/32* (2013.01); *H02M 7/483* (2013.01)

(58) Field of Classification Search
CPC ........... H02M 7/49; H02M 1/32; H02M 7/483
(Continued)

(56) References Cited

U.S. PATENT DOCUMENTS 5,625,545 A 4/1997 Hammond
9,071,174 B2 * 6/2015 Tezuka ...................... H02P 3/04
(Continued)

FOREIGN PATENT DOCUMENTS

EP 1777792 A2 4/2007

OTHER PUBLICATIONS

PCT International Search Report and Written Opinion of International Searching Authority dated Jul. 3, 2020 corresponding to PCT International Application No. PCT/US2020/018987 filed Feb. 20, 2020.

*Primary Examiner* — Alfonso Perez Borroto (57) ABSTRACT

A drive system (500) includes a power converter (510) with power modules (312) supplying power to one or more output phases (A, B, C), a central control system (512) in communication with the power converter (510) and controlling operation of the power modules (312), wherein the central control system (512) comprises an advanced protection module (APM 514) configured via executable instructions to receive input data from an electrical load (520) operably coupled to the one or more output phases (A, B, C) utilizing power converter feedback from the electrical load (520), determine one or more operating conditions of the electrical load (520) based on the input data; and output one or more protection parameters based on a determined operating condition of the electrical load (520) for protecting the electrical load (520).

19 Claims, 5 Drawing Sheets (58) Field of Classification Search
USPC .......................................................... 307/82
See application file for complete search history.

(56) References Cited

U.S. PATENT DOCUMENTS

| | | | | |
|---|---|---|---|---|
| 2004/0183494 | A1* | 9/2004 | Nagaoka ................ | G05B 19/19 |
| | | | | 318/632 |
| 2013/0088799 | A1* | 4/2013 | Zeller .................. | H02H 7/0816 |
| | | | | 361/33 |
| 2014/0060982 | A1* | 3/2014 | Matsumoto ............. | B60T 13/74 |
| | | | | 188/158 |
| 2014/0125149 | A1* | 5/2014 | Matsumoto ............. | H02P 3/025 |
| | | | | 307/115 |
| 2014/0361721 | A1* | 12/2014 | Yamaguchi ............. | H02P 29/68 |
| | | | | 318/472 |
| 2016/0344326 | A1* | 11/2016 | Fujiwara .............. | G05B 13/042 |
| 2017/0288598 | A1* | 10/2017 | Cheng ....................... | H02P 6/08 |

* cited by examiner

SYSTEM AND METHOD FOR PROTECTING AN ELECTRICAL LOAD OF A DRIVE SYSTEM

BACKGROUND

1. Field

Aspects of the present disclosure generally relate to a drive system, specifically a system and a method for protecting an electrical load of a drive system. Such a drive system can be for example medium voltage variable frequency drive. Throughout the specification, the terms "drive", "drive system", "multilevel power converter", "converter", "power supply" and "variable frequency drive (VFD)" can be used interchangeably.

2. Description of the Related Art

Medium voltage (MV) variable frequency drives, such as for example multilevel power converters, are used in applications of medium voltage alternating current (AC) drives, flexible AC transmission systems (FACTS), and High Voltage DC (HVDC) transmission systems, because single power semiconductor devices cannot handle high voltage. Multilevel power converters typically include a plurality of power cells for each phase, each power cell including an inverter circuit having semiconductor switches that can alter the voltage output of the individual cells. One example of a multilevel power converter is a cascaded H-bridge converter system having a plurality of H-bridge cells as described for example in U.S. Pat. No. 5,625,545 to Hammond, the content of which is herein incorporated by reference in its entirety. Another example of a multilevel power converter is a modular multilevel converter system having a plurality of M2C or M2LC subsystems.

Power converters receive three-phase power from an AC source and deliver output power to a load, e.g., a three-phase AC motor. A motor protection relay (MPR) is designed to protect a motor, e.g., three-phase AC motor, against failure. Over current, overload, thermal protection and many other features are provided by a motor protection relay. MPRs are designed to be applied on between the load (AC motor) and grid power rather than between the AC motor and a power converter. There is a desire, however, to apply the MPR to the output of the power converter, for example a VFD.

SUMMARY

Briefly described, aspects of the present disclosure relate to a drive system, embodied for example as a medium voltage variable frequency drive, and more specifically to a system and a method for protecting an electrical output load of a drive system.

A first aspect of the present disclosure provides a drive system comprising a power converter comprising power modules supplying power to one or more output phases, each power module comprising multiple switching devices, a central control system in communication with the power converter and controlling operation of the power modules, wherein the central control system comprises an advanced protection module and at least one processor configured via executable instructions to receive input data from an electrical load operably coupled to the one or more output phases utilizing power converter feedback from the electrical load, determine one or more operating conditions of the electrical load based on the input data; and output one or more protection parameters based on a determined operating condition of the electrical load for protecting the electrical load.

A second aspect of the present disclosure provides a method for protecting an electrical load of a drive system comprising through operation of at least one processor receiving input data from an electrical load coupled to one or more output phases of a power converter utilizing power converter feedback from the electrical load, determining one or more operating conditions of the electrical load based on the input data; and outputting one or more protection parameters based on a determined operating condition of the electrical load for protecting the electrical load.

A third aspect of the present disclosure provides a non-transitory computer readable medium encoded with processor executable instructions that when executed by at least one processor, cause the at least one processor to carry out a method for protecting an electrical load of a drive system as described herein.

DETAILED DESCRIPTION

To facilitate an understanding of embodiments, principles, and features of the present disclosure, they are explained hereinafter with reference to implementation in illustrative embodiments. In particular, they are described in the context of being a drive system, in particular a medium voltage (MV) variable frequency drive including multi-cell power supplies such as modular multilevel converter systems and cascaded H-bridge converter systems. Embodiments of the present disclosure, however, are not limited to use in the described devices or methods.

As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
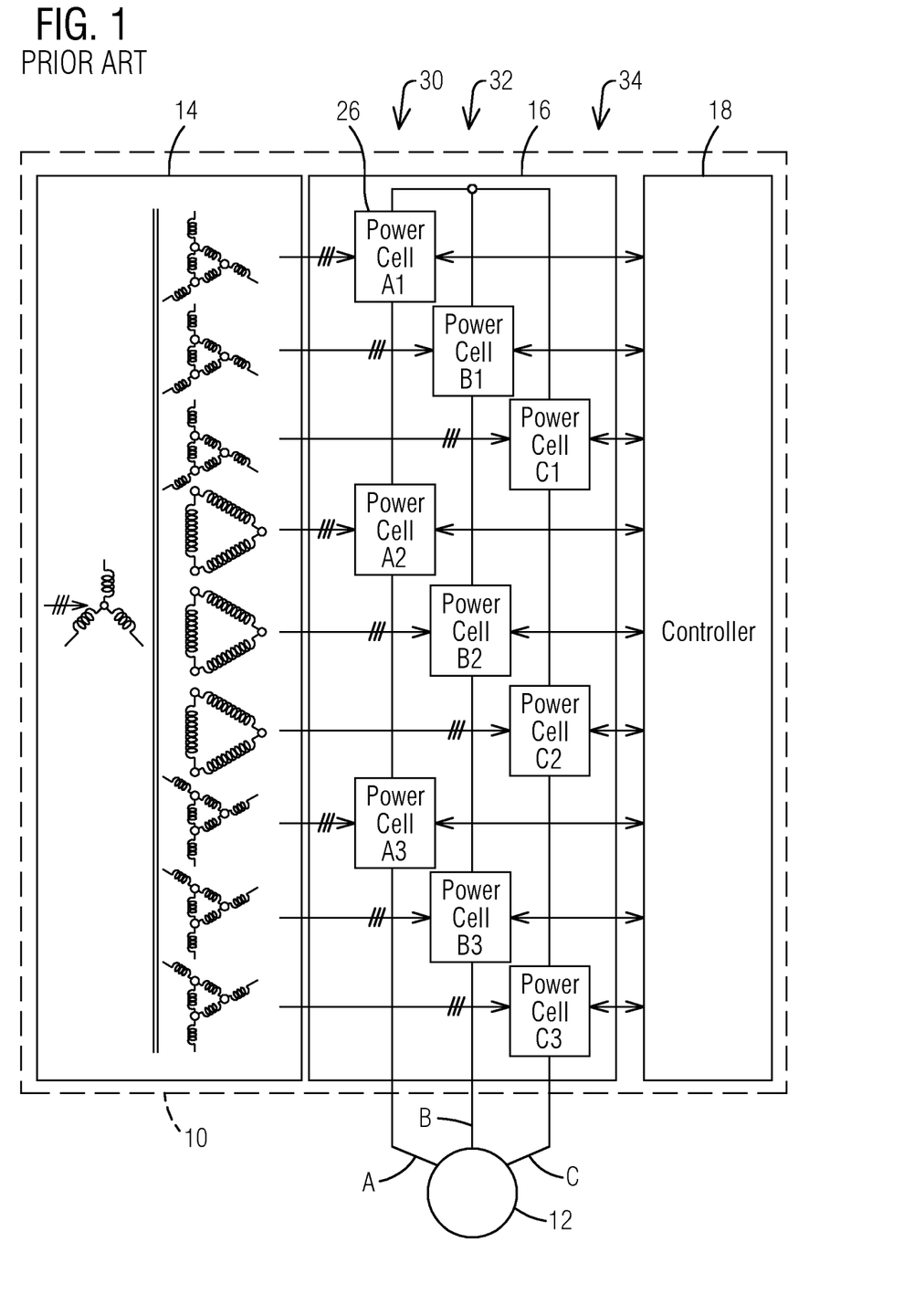
FIG. 1 illustrates a schematic diagram of a known basic configuration of a cascaded H-bridge converter system in accordance with an exemplary embodiment disclosed herein.
Figure 2:
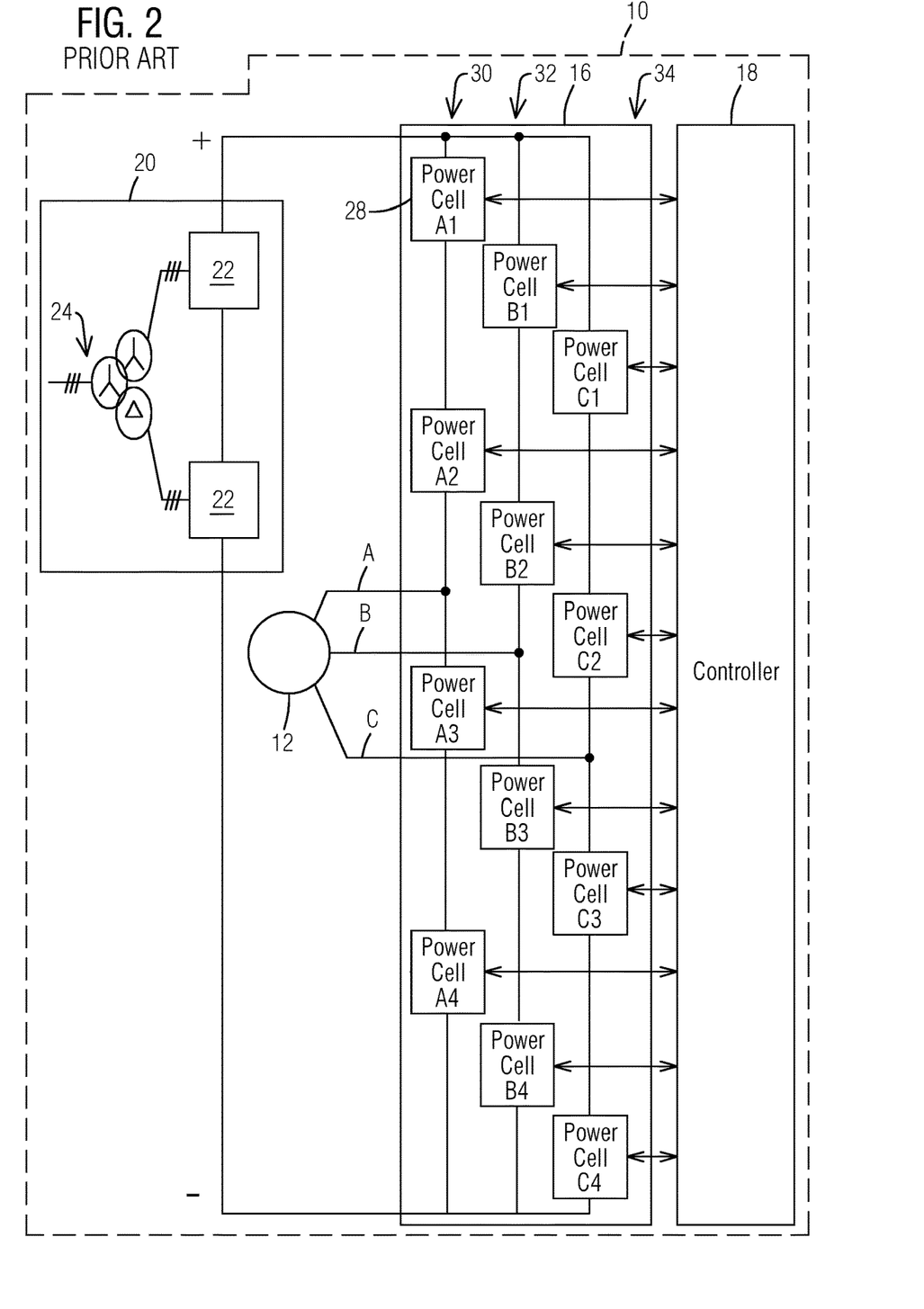
FIG. 2 illustrates a schematic diagram of another known basic configuration of a cascaded H-bridge converter system in accordance with an exemplary embodiment disclosed herein.

FIG. 1 and FIG. 2 each illustrate a schematic of a known multi-cell power supply 10, specifically a cascaded H-bridge converter system that receives three-phase power from an alternating current (AC) source, and delivers power to a load 12, e.g., a three-phase AC motor.

With reference to FIG. 1, the multi-cell power supply 10 includes a transformer 14, a power circuit 16, and a central control system 18, herein also referred to as controller. The transformer 14 includes a primary winding that excites nine secondary windings, and the power circuit 16 includes multiple printed circuit board (PCB) power cells 26, herein simply referred to as power cells 26 or as power modules, that are operably coupled to the secondary windings, respectively, of the transformer 14. As the power supply 10 comprises nine secondary windings, and a power cell 26 is operably coupled to each secondary winding, the power supply 10 comprises nine power cells 26. Of course, the power supply 10 can comprise more or less than nine power cells 26 and/or more or less than nine secondary windings depending on a type of the power supply 10 and/or a type of the load 12 coupled to the power supply 10.

The power cells 26 are configured to provide a medium voltage output to the load 12. Each output phase A, B, C of the power circuit 16 is fed by a group of series-connected power cells 26. Outputs of the power cells 26 are coupled in series in a first phase group 30, at second phase group 32, and a third phase group 34. Each phase output voltage is a sum of the output voltages of the power cells 26 in the respective phase group 30, 32 and 34. For example, the first phase group 30 comprises power cells 26 labelled A1, A2 and A3, wherein the phase output voltage of the output phase A is the sum of the output voltages of the power cells A1, A2 and A3. The same applies to output phase B and power cells B1, B2, B3, and output phase C and power cells C1, C2, C3. In this regard, the power circuit 16 delivers a medium voltage output to output load 12 using lower voltage rated power cells 26 that include components rated to lower voltage standards. Each power cell 26 is coupled, e.g., for example via an optical fiber communication link, to central control system 18, which may use current feedback and voltage feedback to control operation of the power cells 26.

As illustrated in FIG. 2, a multi-cell power supply 10 includes three-phase AC power supply 20, a power circuit 16, and a central control system 18. The three-phase AC power supply 20 includes two diode bridges 22 which are each connected on the AC voltage side to secondary windings of a power converter transformer 24 and are electrically connected in series on a direct current (DC) voltage side. A positive and a negative DC voltage bus are provided for the parallel connection of these phase groups. The power circuit 16 includes power cells 28 that are coupled to the DC voltage bus created by the power supply 20. The power cells 28 are for example lower voltage rated and are configured to provide medium voltage output to load 12. Although the load 12 may be illustrated as being within the multi-cell power supply 10, the load 12 is not part of the multi-cell power supply 10. Rather, the load 12 is separate from, and connected to, the multi-cell power supply 10, as more clearly shown in FIG. 1.

Each output phase A, B, C of the power circuit 16 is fed by a group of series-connected power cells 28, also labelled A1-A4, B1-B4 and C1-C4 with reference to the output phases A, B, C. The power cells 28 are coupled in series in a first phase group 30, a second phase group 32, and a third phase group 34. Each phase output voltage is a sum of the output voltages of the power cells 28 in the phase group 30, 32 and 34 as described before with reference to FIG. 1. The power circuit 16 delivers a medium voltage output to the load 12 using lower voltage rated power cells 28 that include components rated to lower voltage standards. Each power cell 28 is coupled, e.g., for example via optical fiber communication link(s), to the controller 18, which can use current feedback and voltage feedback to control operation of the power cells 28.

It should be noted that in FIG. 1 and FIG. 2 the number of power cells 26, 28 in each phase group 30, 32, 34 can be between 2 and 12 to provide different (medium voltage) outputs as required by the load 12. As noted in the embodiment of FIG. 1, the number of secondary windings of transformer 14 matches the number of power cells 26. In the embodiment of FIG. 2, a number of diode bridges and transformer secondary windings can vary from 1 to 6 to allow for harmonic cancellation on the primary side of the transformer 24. It will be appreciated by those of ordinary skill in the art that other cell counts, and diode bridge counts may be used depending upon the application and that the configurations shown and described herein are intended to be exemplary in natures.

Figure 3:
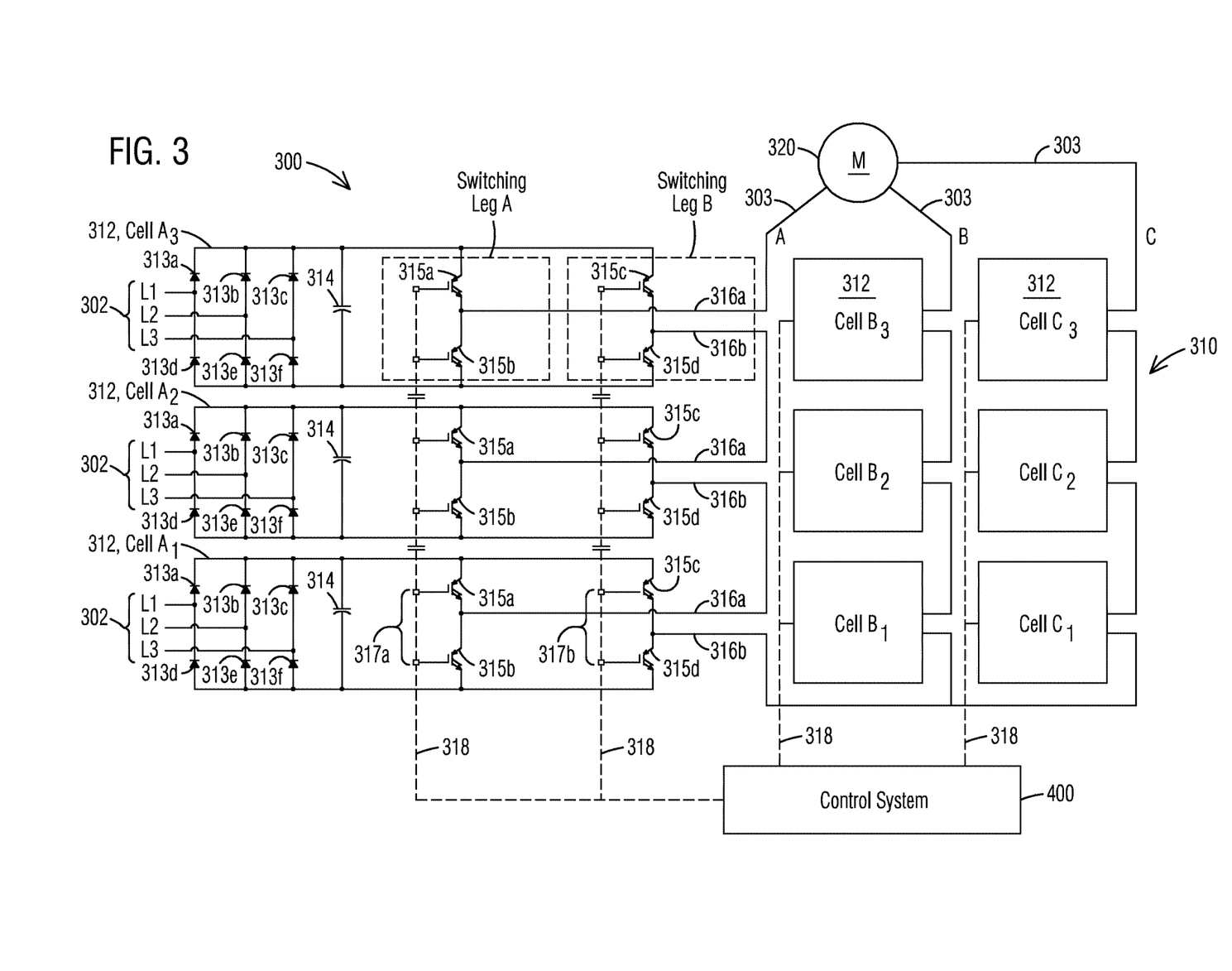
FIG. 3 illustrates a schematic diagram of a drive system in accordance with an exemplary embodiment disclosed herein.

FIG. 3 illustrates a schematic diagram of a drive system 300 comprising cascaded H-bridge multilevel converter 310 having a seven-level topology, including three phases with three power cells per phase, which incorporates a control system 400 in accordance with an aspect of the present disclosure. An example of a cascaded H-bridge multilevel converter 310 is the Perfect Harmony GH180® drive manufactured by Siemens Industry, Inc.

In the example of FIG. 3, the system 300 is a medium voltage drive comprising a three-phase power source providing a power input 302 via lines L1, L2 and L3. The multilevel converter 310 is connected to the AC power input 302 and produces a three-phase AC power supply as output 303, via output phases A, B and C. The AC output 303 can be connected to a load 320, which in this example comprises an AC induction motor. The motor 320 may be operated by controlling the frequency and/or amplitude of the output voltage produced by the multilevel converter 310.

Each phase of the multilevel converter 310 comprises a respective phase leg formed from a plurality of power cells 312 arranged in a cascaded manner. In the example of FIG. 1, phase legs Leg A, Leg B are each formed from the same number of power cells 312, namely three, that are connected in series. Each power cell 312 of a phase is connected to the power input 302 via respective input lines L1, L2 and L3. Power to the input lines L1, L2, L3 may be provided, for example, via a multi-phase winding transformer.

The power cells 312 of the three phases are respectively labelled as cell $A_1$ through cell $A_3$, cell $B_1$ through cell $B_3$ and cell $C_1$ through cell $C_3$. Each power cell 312 is responsive to control signals from the control system 400, which include for example pulse width modulation (PWM) signals to alter voltage level and/or frequency output, resulting in a multilevel voltage waveform for each phase. The power cells 312 generally include power semiconductor switching devices, passive components (inductors, capacitors), control circuits, processors, interfaces, and other components for communicating with the control system 400, i.e. the power cells 312 operate based on signals from the control system 400.

Each of the power cells 312 include single-phase inverter circuitry connected to separate direct current (DC) sources produced by a rectification of the AC power input for each power cell 312 via input lines L1, L2, L3. In this example, the rectification is carried out by diode rectifiers 313a-f arranged in a bridge rectifier configuration. The present example also uses filtering circuitry including, for example, a capacitor 314, for smoothing out voltage ripples from the rectified DC power.

The inverter circuitry of each cell 312 comprises power semiconductor switching devices 315a-d arranged in an H-bridge, also referred to as full bridge, configuration. The switching devices 315a-d may include, for example and without limitation, power transistors such as insulated-gate bipolar transistors (IGBT). The switching devices 315a, 15b connect to cell output line 316a while the switching devices 315c, 315d connect to cell output line 316b. The transistors 315a-d receive pulse width modulation signals, for example, in the form of gate input signals 318 controlled by the control system 400 based on pulse width modulation. The control system 400 selects either of transistors 315a or 315b to be ON via a first switching leg 317a, and either of transistors 315c or 315d to be ON via a second switching leg 317b, which will permit power to pass to the load 320 by way of the line 316a or 316b respectively. In other words, a controller triggered switching event of the switching leg 317a causes one of the transistors 315a, 315b to be in an ON state and the other to be in OFF state. Likewise, a controller triggered switching event of the switching leg 317b causes one of the transistors 315c, 315d to be in an ON state and the other to be in OFF state. In the embodiments illustrated, the switching legs 317a, 317b of an individual cell 312 are simply referred to as switching leg A and switching leg B of that individual cell 312.

Each of the power cells 312 may be constructed internally to low-voltage standards, despite its inclusion in a medium-voltage apparatus drive 300. By way of example, each power cell 312 may have a 600-volts rating. Thus, the maximum voltage level that can be output by each of the power cells 312 is about 600 VDC. Depending on which transistors are ON, the output voltage across the cell output lines 316a, 316b of each power cell 312 may be of either polarity or zero. Thus, each power cell 312 can have three output states: +600 VDC, −600 VDC, or ZERO VDC. Due to the serial connection between three power cells 312 in each phase output line, such as, for example, cells $A_1, A_2, A_3$ to the output phase A, it is possible to produce a maximum output voltage magnitude of about 1800 VDC for the respective phase output line. Each power cell 312 may be operated independently of another. Therefore, it is possible to provide at least seven voltage levels per phase to motor 320. The approximate values of these line-neutral voltage states include +/−1800 VDC, +/−1200 VDC, +/−600 VDC and ZERO VDC.

The electric motor 320 may comprise any type AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor 320 may be connected. Other loads may be used instead of or in addition to the motor 320. The motor 320 responds to the voltage applied by the multilevel converter on the three phases, for example, to increase, decrease or maintain a speed or position.

Figure 4:
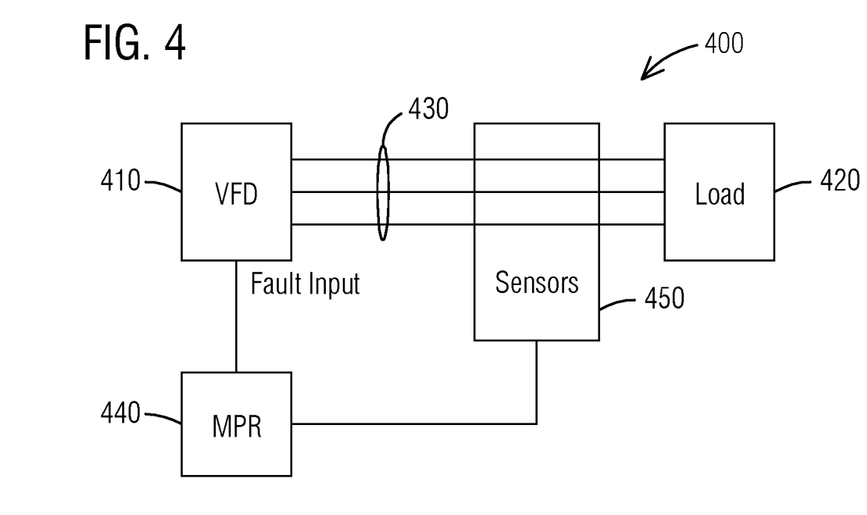
FIG. 4 illustrates a schematic diagram of drive system with a conventional motor protection relay (MPR) in accordance with an exemplary embodiment disclosed herein.

FIG. 4 illustrates a schematic diagram of drive system 400 with a conventional motor protection relay (MPR) in accordance with an exemplary embodiment disclosed herein. Drive system 400 comprises VFD 410 which can be configured for example as described with reference to FIG. 1, FIG. 2 or FIG. 3. VFD 410 is operably coupled to an electrical output load 420, which can be for example a three phase AC induction motor. As described before, the VFD 410 receives three-phase power from an alternating current (AC) source and delivers three phase power (voltage) to the output load 420 via three phase power conductors 430.

Conventional drive system 400 further comprises motor protection relay (MPR) 440 which is designed to protect the load 420, e.g., three-phase AC motor, against failure. Over current protection, overload protection, thermal protection and many other protective features are provided by the MPR 440. MPR 440 can be microprocessor based and receives voltage and current information of the electrical load 420 via voltage and current sensors 450. Such sensors 450 can include for example a current transformer (CT) and a potential transformer (PT). Based on the received voltage and current information, for example via current transformer (CT) and potential transformer (PT), the MPR 440 determines whether the load 420 is operating under normal conditions or abnormal (faulty) conditions. Operating the load 420 under abnormal conditions, such as thermal overload, over current, etc., may lead to failure of the load 420. When an abnormal operation condition occurs or exists, the MPR 440 provides a corresponding fault input signal to the VFD 410 which in turn controls the VFD 410 to protect the load 420, for example isolates the load 420 from input power.

In the drive system 400, the MPR 440 is arranged between the load 420 and grid power (power conductors 430). There is a desire, however, to apply an MPR to an output of the VFD 410. Ranges of frequency and voltage changes are much smaller on the grid than at the VFD 410. Currently, protective levels, such as thermal model parameters, under/over speed, under/over voltage, under/over frequency, etc., must be chosen as a single value and may not be entered for example as a function of a speed of the AC motor (load 42).

Figure 5:
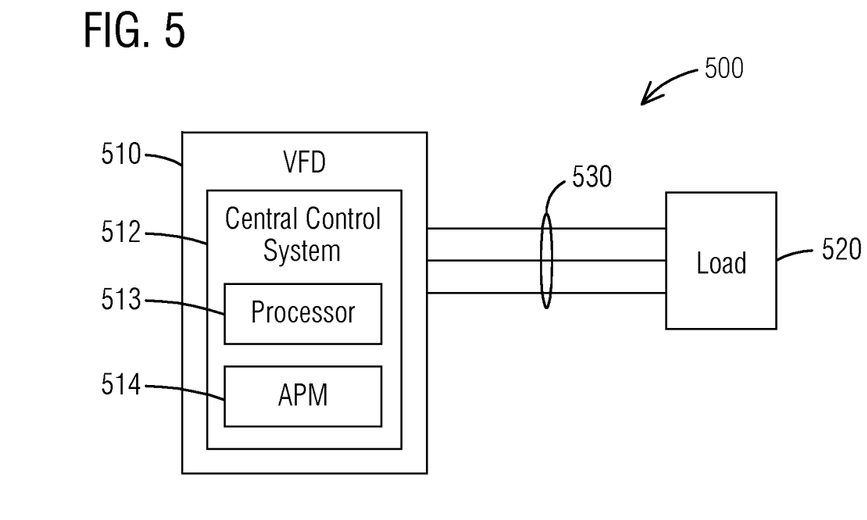
FIG. 5 illustrates a schematic diagram of a drive system with an advanced protection module (APM) in accordance with an exemplary embodiment disclosed herein.

FIG. 5 illustrates a schematic diagram of a drive system 500 with an advanced protection module (APM) in accordance with an exemplary embodiment disclosed herein. Drive system 500 comprises a power converter 510, configured as VFD for example as described with reference to FIG. 1, FIG. 2 or FIG. 3. The VFD 510 is operably coupled to an electrical output load 520, which can be for example a three phase AC induction motor. As described before, the VFD 510 receives three-phase power from an alternating current (AC) source and delivers three phase power (voltage) to the output load 520 via three phase power conductors 530.

The VFD 510 comprises a central control system 512 which is configured to control operation of the VFD 510, such as controlling operation of multiple power cells of the VFD 510. The central control system 512 uses for example current feedback and voltage feedback for control purposes. In an example, the central control system 512 is a purpose specific digital control system, that splits tasks of control loop command and status, power cell control information and external communications interface into three separate components. The three separate main components are a control processor/host central processing unit for control loop commands, status and non-drive interfaces, a field programmable gate array (FPGA) for power cell control and communications, and an electronically programmable logic device (EPLD) for external communication. The main components require a dedicated data bus on a printed circuit board (PCB) so that the main components can exchange information between them for a successful operation of the drive system.

In an exemplary embodiment of the present disclosure, the central control system 512 comprises an advanced protection module (APM) 514. The APM 514 can be embodied as software, as hardware or as a combination of software and hardware. The APM 514 is fully integrated into the VFD 510 itself, and thus requires no separate installation or mounting.

In an example of a medium voltage AC motor as load 520, it is operated either directly online (DOL) or through VFD 510. Thus, the motor requires protection from input line events, high temperatures, insulation and bearing failures, and conditions created by a change in a load including but not limited to overload, underload, imbalance, jamming. The APM 514 is configured to assure load, e.g., AC motor, protection and process protection, and protection settings are defined in such a way as to prevent load and process damage, which can occur in various manners and conditions. Today industrial equipment is designed to be operated for 20 years or longer. Loads, such as medium voltage AC motors, are exposed to environmental and mechanical stresses that, over time, could lead to degradation and malfunction. The monitoring and protection of such medium voltage motors are an essential element in the overall industrial process protection. These protection schemes are needed to avoid financial losses caused by unexpected process downtown.

In an embodiment, the APM 514 is configured as a combination of hardware and software and comprises algorithms used to protect the system 500, specifically the load, e.g. motor, 520, from such events. In addition, some features can also be configured to detect and protect against undesirable process conditions.

Figure 6:
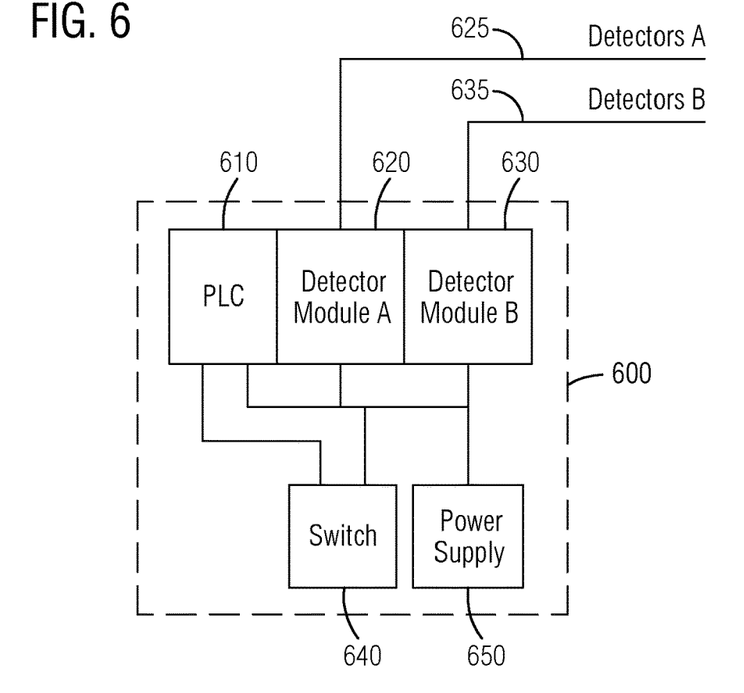
FIG. 6 illustrates a hardware block diagram of a resistance temperature detector (RTD) interface associated with an advanced protection module in accordance with an exemplary embodiment disclosed herein

FIG. 6 illustrates a hardware block diagram of a resistance temperature detector (RTD) interface 600 associated with an advanced protection module in accordance with an exemplary embodiment disclosed herein. The hardware of the RTD interface 600 is used to measure temperatures for the purpose of providing detection to a load, e.g. load 520.

RTD interface 600 comprises a controller, configured for example as programmable logic controller (PLC) 610. The PLC 610 is communicatively coupled to detector module A 620 and detector module B 630. Detector module A is for example a 4-channel resistance temperature detector (RTD) module 620 and detector module B is for example an 8-channel resistance temperature detector (RTD) module 630. PLC 610 and detector modules 620, 630 receive power for operation from power supply 650, which can be for example a +24V power supply. Further, PLC 610 and detector modules 620, 630 are communicatively coupled to a network switch 640, such as for example an Ethernet switch, to be able to communicate with other control components of the central control system 512, see FIG. 5. For example, the PLC 610 converts analog signals of the detector modules 620, 630 into digital signals and transmits the digital signals to the central control system 512 via network switch 640. Specifically, the PLC 610 converters analog temperature signals into digital temperature signals/values.

In an exemplary embodiment, the RTD interface 600 is operably coupled to the central control system 512 and provides input data for the APM 514, for example via network switch 640. The APM 514 is run on and incorporated in the central control system 512 of the VFD 510. The central control system 512 includes at least one processor 513 configured via executable instructions to receive input data from an electrical load, such as electrical load 520, operably coupled to a power converter, such as VFD 510, determine one or more operating conditions (states) of the electrical load 520 based on the input data, and output one or more protection parameters based on a determined operating condition (state) of the electrical load 520 for protecting the electrical load 520.

The drive system 500, specifically central control system 512 and APM 514 use integral closed-loop hall effect current sensors and output attenuators to obtain accurate input load (motor) data and integrate the data into the algorithms of the APM 514. The closed-loop hall effect current sensors and output attenuators may already be installed within the drive system 500, wherein the data of these elements may now be used by the APM 514. These data are provided as input data for the APM 514, for example via network switch 640. As mentioned before, network switch 640 can be an Ethernet switch used for communication with other devices or elements of the central control system 512. In addition to the current sensors and output attenuators, the APM 514 receives temperature data relating to the electric motor (load 520) from detectors A and B, which are resistance temperature detectors 625, 635, via RTD interface 600. Specifically, resistance temperature detectors (RTD) 625 feed information to detector module 620 and resistance temperature detectors 635 feed information to detector module 630. The temperature related information as well as the current sensor data and output attenuator data is utilized and processed by the APM 514 within the central control system 512 for load and process protection functions.

In an embodiment, the one or more protection parameters include trip levels and pick up levels that are a function of a speed (based on speed curve) of the electrical load 520 and/or that can be based on a process curve of the drive system 500. For example, the trip levels and pick up levels can be chosen at various points across the speed curve of the electrical load 520, for example at various points of a normal operating condition, alarm setting condition and fault setting condition across the speed curve.

The protection parameters include fixed levels and variable levels. These fixed and variable levels (parameters) include for example:

| | |
|---|---|
| fixed over speed, | variable over speed, |
| fixed under speed, | variable under speed, |
| fixed under current, | variable under current, |
| fixed under power, | |
| fixed torque pulsation, | |
| fixed negative sequence over current, | |
| maximum start time, | |
| maximum stop time, | |
| fixed thermal overload, | variable thermal overload, |
| fixed RTD protection, | |
| fixed instantaneous over current, | |
| fixed zero sequence over voltage, | |
| fixed inverse time over current, | |
| fixed instantaneous zero sequence over voltage, | |
| fixed maximum power factor, | |
| fixed minimum power factor, | |
| notching or jogging, starts per hour, | |
| notching or jogging, cold starts per hour, | |
| nothing or jogging, hot starts per hour, | |
| notching or jogging, maximum thermal capacity used to start, | |

| | |
|---|---|
| fixed over frequency, | variable over frequency, |
| fixed under frequency, | variable under frequency, |
| fixed high frequency rate of change. | |

The mentioned fixed levels and variable levels are described below.

Fixed (pickup) over speed is used to protect the electric motor and connected load 520 against excessive speed. The fixed pickup over speed function provides a single speed point setting that produces a trip or alarm condition when that speed is exceeded. The function can be enabled once a programmable time period has elapsed since the starting of the motor.

Variable (pickup) over speed is used to protect the electric motor and connected load 520 against excessive speed or to detect conditions under which the motor speed has risen in excess of the desired setpoint. The variable pickup over speed function provides a curve of overspeed points as a function of the commanded motor speed. A trip or alarm condition occurs when that speed is exceeded. The function can be enabled once a programmable time period has elapsed since the starting of the motor.

Fixed (pickup) under speed is used to protect the electric motor and connected load 520 against operation at speeds below the desired speed. The fixed pickup under speed function provides a single under speed point setting that produces a trip or alarm condition when that speed falls below that value. The function offers a minimum speed enable that only allows activation of this function after the programmable minimum speed has been reached. Once the minimum speed has been reached, the function remains enabled regardless of speed until the drive stops.

Variable (pickup) under speed is used to protect the electric motor and connected load 520 against operation at lower speeds than desired or to detect conditions under which the motor speed has fallen below the desired setpoint due to problems with excessive load torque or torque production difficulties in the machine. The variable pickup under speed function provides a curve of speed points as a function of the commanded motor speed. A trip or alarm condition occurs when the speed falls below the curve at a given speed setting. The function offers a minimum speed enable that only allows activation of this function after the programmable minimum speed has been reached. Once the minimum speed has been reached, the function remains enabled regardless of speed until the drive stops or the demand is set to a value below the minimum speed reset. The minimum speed reset is used to define a range of demand settings below which the function will remain in a reset condition.

Fixed (pickup) under current is used to protect the motor against operation with RMS (root mean square) phase currents that are below the desired level. The fixed pickup under current function provides an RMS phase current setting that produces a trip or alarm condition when the current falls below that value. The function can be programmed to produce a trip or an alarm when any one, any two, or all three of the phase currents (Phase A, Phase B, Phase C RMS currents) is below the set point. The function offers an enable that latches once a programmable minimum speed has been reached. The function can also be enabled once a programmable time period has elapsed since the starting of the motor.

Variable (pickup) under current is used to protect the load 520/system 500 operation with RMS phase currents that are below the desired level where sensitivity to the speed demand setting is important. The variable pickup undercurrent function provides a curve of undercurrent set points as a function of the commanded motor speed. A trip or alarm condition occurs when the current falls below the curve at a given speed setting. The function can be programmed to produce a trip or an alarm when any one, any two, or all three of the phase currents is below the set point. The function offers an enable that latches once a programmable minimum speed has been reached. The function can be enabled when the speed reference is above a programmable level. The function can also be enabled once a programmable time period has elapsed since the starting of the motor.

Fixed (pickup) under power is used to protect the electric motor and connected load 520 against operation at power levels below desired. The fixed pickup under power function provides a single power point setting that produces a trip or alarm condition when the power falls below that value. The function offers an enable that latches once a programmable minimum speed has been reached. The function can also be enabled once a programmable time period has elapsed since the starting of the motor.

Fixed (pickup) torque pulsation is used to protect the electric motor and connected load 520 against operation under conditions of high torque pulsation. The fixed pickup torque pulsation function provides a single RMS torque pulsation point setting that produces a trip or alarm condition when RMS torque pulsation rises above that value. The function can be enabled when above a minimum speed. The function can also be enabled once a programmable time period has elapsed since the starting of the motor.

Torque producing current and motor flux associated with motor operation allows for the calculation of motor torque as the product of torque producing current and the machine magnetic flux. The torque producing current is the component of machine current that is in phase with the machine voltage. A given machine has a maximum rated value of torque producing current that combines with any flux producing current to form the overall rated stator current. The torque can be resolved into two components, one component being the torque average value and the other being small amplitude variation (or cyclical component) that can be added together to obtain the total torque. Torque pulsation protection focuses on the time varying part, specifically the RMS value of the pulsating part of the torque. The protection calculates RMS torque pulsation by sampling and recording the torque over a specific length time window. The window of time is selectable and should be chosen to be long enough to contain several cycles of torque variation.

Fixed (pickup) negative sequence over current is used to protect the motor and connected load 520 against operation under conditions of high negative sequence current or phase current imbalance. The fixed pickup negative sequence overcurrent function provides a single negative sequence overcurrent setting that produces a trip or alarm condition when the negative sequence current rises above that value. The function offers an enable that latches once a programmable minimum speed has been reached. The function can also be enabled once a programmable time period has elapsed since the starting of the motor.

Maximum start time protects the motor against excessive time between starting and reaching a desired speed. The function produces a trip or alarm condition when the machine fails to reach an adjustable speed threshold in an adjustable time period following a start.

Maximum stop time protects the motor against excessive time between the stop command and dropping down to a desired speed. The function produces a trip or alarm condition when the machine fails to reach an adjustable speed threshold in an adjustable time period following a stop.

The fixed (parameter) thermal overload function uses a first order differential equation to track the amount of thermal capacity used in the machine as described in IEC 60255-149. Thermal capacity is used up as the machine temperatures approach maximum rated or allowable conditions. An equivalent heating current is calculated that takes into account the RMS phase currents of the machine as well as the amount of negative sequence current. The heat input to the machine is determined based on the square of the equivalent heating current divided by an adjustable rated current. The thermal capacity is adjusted based on thermal time constants for heating, cooling, or stopped conditions in the machine in accordance with a first order differential equation that accounts for heat inputs and heat outputs in the machine. The fixed parameter function uses single values of rated current, heating time constant, and cooling time constant. An adjustable threshold can be set to limit the maximum amount of thermal capacity used. The function reports a trip or alarm condition or can block starting of the motor when the thermal capacity used exceeds the programmed value. The thermal model of the machine can be biased by RTD measurements, provided for example by RTD interface 600, of ambient temperature and/or stator temperature. Ambient RTD readings are used to compensate for the effects of an ambient temperature other than rated, stator RTD readings are used to set minimum thermal capacity used values based on the stator temperature.

The variable (parameter) thermal overload function uses a first order differential equation to track the amount of thermal capacity used in the machine as described in IEC 60255-149. Thermal capacity is used up as the machine temperatures approach maximum rated or allowable conditions. An equivalent heating current is calculated that takes into account the RMS phase currents of the machine as well as the amount of negative sequence current. The heat input to the machine is determined based on the square of the equivalent heating current divided by an adjustable rated current. The thermal capacity is adjusted based on thermal time constants for heating, cooling, or stopped conditions in the machine in accordance with a first order differential equation that accounts for heat inputs and heat outputs in the machine. The variable parameter function uses values of rated current, heating time constant, and cooling time constant that are a function of the demand speed. An adjustable threshold can be set to limit the maximum amount of thermal capacity used. The function reports a trip or alarm condition or can block starting of the motor when the thermal capacity used exceeds the programmed value. The thermal model of the machine can be biased by RTD measurements of ambient temperature and/or stator temperature, provided for example by RTD interface 600. Ambient RTD readings are used to compensate for the effects of an ambient temperature other than rated, stator RTD readings are used to set minimum thermal capacity used values based on the stator temperature.

Fixed (pickup) RTD function allows the use of up to 12 RTD temperature sensors to provide general overtemperature protection, provided by RTD interface 600, see FIG. 6. A fixed temperature pickup level can be assigned to each RTD individually. RTDs can also be assigned to the stator or ambient groups for use in either the fixed or variable pickup thermal models. An alarm or trip response to an open or shorted RTD can be selected.

Fixed (pickup) instantaneous over current is used to protect the electric motor and connected load 520 very quickly against operation under conditions of high current. The fixed pickup instantaneous overcurrent function provides a single instantaneous overcurrent setting that produces a trip or alarm condition when the current rises above that value. The function can be programmed to produce a trip or an alarm when any one, any two, or all three of the phase currents is above the set point. The function offers an enable that latches once a programmable minimum speed has been reached. The function can also be enabled once a programmable time period has elapsed since the starting of the motor.

Fixed (pickup) inverse time overcurrent is used to protect the electric motor and connected load 520 against operation under conditions of high current with a trip time that is inversely related to the amount of current. The fixed pickup inverse time overcurrent function provides a single instantaneous overcurrent setting that produces a trip or alarm condition when the chosen inverse time characteristic is met. The function can be programmed to produce a trip or an alarm when any one, any two, or all three of the phase currents has met its inverse time curve. A variety of IEEE, ANSI, IEC, and IAC inverse time curves are selectable as well as a user defined curve function. The function offers an enable that latches once a programmable minimum speed has been reached. The function can also be enabled once a programmable time period has elapsed since the starting of the motor.

Fixed (pickup) maximum power factor is used to protect the electric motor against operation under conditions of high-power factor that would indicate abnormal conditions in the machine. The fixed pickup maximum power factor function provides a single maximum power factor setting that produces a trip or alarm condition when the power factor. The function can be enabled when the speed demand is above a programmable level. The function can also be enabled once a programmable time period has elapsed since the starting of the motor.

Fixed (pickup) minimum power factor is used to protect the electric motor against operation under conditions of low power factor that would indicate abnormal conditions in the machine. The fixed pickup minimum power factor function provides a single minimum power factor setting that produces a trip or alarm condition when the power factor. The function can be enabled when the speed demand is above a programmable level. The function can also be enabled once a programmable time period has elapsed since the starting of the motor.

Fixed (pickup) instantaneous zero sequence overvoltage is used to protect the electric motor very quickly under conditions of high zero sequence voltage which could be caused by high phase to ground leakage or a ground fault. The fixed pickup zero sequence overvoltage function provides a single zero sequence overvoltage setting that produces a trip or alarm condition when the zero-sequence voltage rises above that value. The function offers an enable that latches once a programmable minimum speed has been reached. The function can also be enabled once a programmable time period has elapsed since the starting of the motor.

Fixed (pickup) definite minimum time zero sequence overvoltage is used to protect the electric motor against sustained operation under conditions of high zero sequence voltage which could be caused by high phase to ground leakage or a ground fault. The fixed pickup zero sequence overvoltage function provides a single zero sequence overvoltage setting that produces a trip or alarm condition when the zero-sequence voltage rises above that value. The function offers an enable that latches once a programmable minimum speed has been reached. The function can also be enabled once a programmable time period has elapsed since the starting of the motor.

The (notching or jogging) starts per hour function is used to enforce a minimum time between starts of the machine. A programmable minimum time since last start can be set. A start attempt prior to the expiration of the minimum time can be programmed to trip, alarm, or block start.

The (notching or jogging) cold starts per hour function is used to enforce a maximum number of cold starts of the machine over an adjustable time period. An attempt to cold start the machine in excess of the allowable number can be programmed to trip, alarm, or block start. A cold start is defined as a start that occurs when the thermal capacity used is below an adjustable value.

The (notching or jogging) hot starts per hour function is used to enforce a maximum number of hot starts of the machine over an adjustable time period. An attempt to hot start the machine in excess of the allowable number can be programmed to trip, alarm, or block start. A hot start can be defined as any start or a start that occurs when the thermal capacity used is above the adjustable value used by the cold starts per hour function.

The (notching or jogging) maximum thermal capacity used to start function is used to ensure that the machine has sufficient thermal capacity available to allow a start. An attempt to start the machine without sufficient thermal capacity available can be programmed to trip, alarm, or block start. The maximum amount of thermal capacity used when a start is no longer allowed is an adjustable parameter.

Fixed (pickup) over frequency is used to protect the electric motor and connected load 520 against sustained operation under conditions of higher than desired frequency. The fixed pickup over frequency function provides a single over frequency setting that produces a trip or alarm condition when the frequency rises above that value. The function offers an enable that latches once a programmable minimum speed has been reached. The function can also be enabled once a programmable time period has elapsed since the starting of the motor.

Variable (pickup) over frequency is used to protect the electric motor and connected load 520 against operation at higher frequencies than desired or to detect conditions under which the motor frequency has risen above the desired setpoint due to problems with load regeneration or other difficulties in the machine or load. The variable pickup over frequency function provides a curve of over frequency points as a function of the commanded motor speed. A trip or alarm condition occurs when that frequency rises above the curve at a given speed setting. The function offers an enable that latches once a programmable minimum speed has been reached. The function can be enabled when the speed reference is above a programmable level. The function can also be enabled once a programmable time period has elapsed since the starting of the motor.

Fixed (pickup) under frequency is used to protect the electric motor and connected load 520 against sustained operation under conditions of lower than desired frequency. The fixed pickup underfrequency function provides a single underfrequency setting that produces a trip or alarm condition when the frequency falls below that value. The function offers an enable that latches once a programmable minimum speed has been reached. The function can also be enabled once a programmable time period has elapsed since the starting of the motor.

Variable (pickup) under frequency is used to protect the electric motor and connected load 520 against operation at lower frequencies than desired or to detect conditions under which the motor frequency has fallen below the desired setpoint due to problems with excessive load torque or other difficulties in the machine or load. The variable pickup underfrequency function provides a curve of underfrequency points as a function of the commanded motor speed. A trip or alarm condition occurs when that frequency falls below the curve at a given speed setting. The function offers an enable that latches once a programmable minimum speed has been reached. The function can be enabled when the speed reference is above a programmable level. The function can also be enabled once a programmable time period has elapsed since the starting of the motor.

Fixed (pickup) high frequency rate of change is used to protect the electric motor and connected load 520 against fast changing frequencies or high rates of acceleration. The fixed pickup high frequency rate-of-change function provides a single frequency rate of change setting that produces a trip or an alarm condition when the rate-of-change of frequency rises above that value. The function offers an enable that latches once a programmable minimum speed has been reached. The function can also be enabled once a programmable time period has elapsed since the starting of the motor.

In an exemplary embodiment of the present disclosure, status of the protection parameters (fixed and variable levels) and a temperature of the RTDs 625, 635 can be displayed on a display or screen of for example a keypad, a control system or a human-machine-interface (HMI). In an example, the central control system 512 may be connected to a display for displaying different information and data, such as status of the protection parameters etc.

In another exemplary embodiment, the central control system 512 is configured to store faults or alarms with respect to the operating conditions and associated protection parameters of the electrical load 520, for example in a drive event log. The faults and alarms can then be viewed via the drive event log. As described before, the operation conditions of the electric motor (load 520) include normal operating condition, alarm setting operating condition and a fault setting operating condition. In an example, when the APM 514 has determined that the electric motor (load 520) is operating in an alarm setting operating condition, the APM 514 outputs a corresponding protection parameter, such as for example fixed over speed or variable thermal overload. Consequently, the drive system 500, specifically the central control system 512, controls the VFD 510 and/or load 520 such that the load 520 is protected and operates for example within the predefined fixed and/or variable levels. In case of a fixed over speed, a trip or alarm condition is produced when the predefined speed is exceeded and the VFD 510 may reduce its output power so that the electric motor slows down and reduces speed so that the speed is below the fixed over speed value. Further, as mentioned before, the corresponding protection parameter can be stored and displayed on a display, using for example Boolean values, such as "Fixed over speed: 1". When the electric motor operates under normal conditions, the drive system 500 may display "Fixed over speed: 0".

Figure 7:
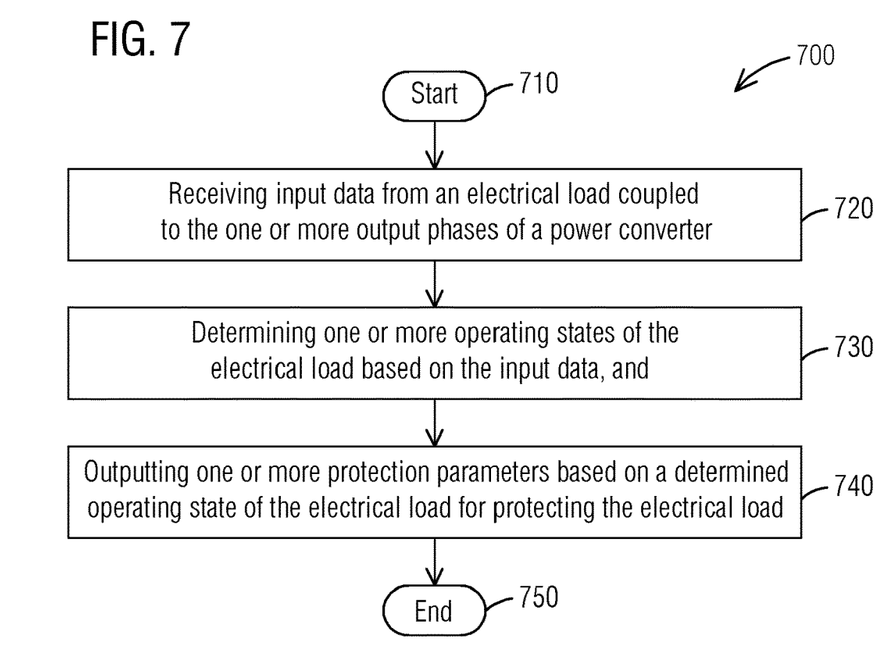
FIG. 7 illustrates a flow chart of a method for protecting an electrical load of a drive system in accordance with an exemplary embodiment disclosed herein.

FIG. 7 illustrates a flow chart of a method 700 for protecting an electrical load of a drive system in accordance with an exemplary embodiment disclosed herein. The method 700 facilitates controlling and/or protection function. While the method is described as being a series of acts that are performed in a sequence, it is to be understood that the method may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method may start at 710 and may include through operation of at least one processor 513 an act 720 of receiving input data from an electrical load 520 coupled to the one or more output phases (A, B, C). The method 700 may further include an act 730 of determining one or more operating states of the electrical load 520 based on the input data, and an act 740 of outputting one or more protection parameters based on a determined operating state of the electrical load 520 for protecting the electrical load 520. At 750 the method may end.

The described method 700 relates to a drive system including a power converter, such as a VFD, and an electrical load, such as an AC induction motor, as described previously with respect to FIG. 5 and FIG. 6, wherein the power converter can be configured as described with reference to FIG. 1, FIG. 2 or FIG. 3.

In another embodiment, the method 700 may include through operation of the at least one processor 513 an act of controlling the electrical load 520 according to the one or more output protection parameters. In another embodiment, the method 700 may include displaying the determined operating condition and/or associated protection parameters on a display. A determined operating condition can be a normal operating condition, an alarm setting operating condition, or a fault setting operating condition of the electrical load 520.

As described before with reference to FIG. 5 and FIG. 6, the one or more protection parameters comprise predefined fixed levels and predefined variable levels, including levels that are a function of a speed of the electrical load 520 and/or that are based on a process curve of the drive system 500. A predefined fixed level is selected from a group of fixed over speed, fixed under speed, fixed under current, fixed under power, fixed torque pulsation, fixed negative sequence over current, fixed thermal overload, fixed resistance temperature detector (RTD) protection, fixed instantaneous over current, fixed zero sequence over voltage, fixed inverse time over current, fixed instantaneous zero sequence over voltage, fixed maximum power factor, fixed minimum power factor, fixed over frequency, fixed under frequency, fixed high frequency rate of change, and a combination thereof. A predefined variable level is selected from a group of variable over speed, variable under speed, variable under current, variable thermal overload, variable over frequency, variable under frequency, and a combination thereof.

The described system 500, 600 and method 700 allow protection levels that vary with the speed of the electric motor (load 520). The protection levels can be matched with the way the motor (load) parameters themselves vary. A more accurate protection level results and the electric machine can be utilized to a greater extent since inaccurate protection levels do not allow full utilization of the electric machine. The fixed and variable protection levels provide comprehensive motor and load monitoring and protection. Drive integral sensor provide reliable motor feedback for protection across the speed range of the electric machine. All faults or alarms are stored in the drive event log for reference. By integrating the APM 514 into the drive (VFD 510), protection schemes are simplified, and space and engineering efforts are saved.

In another exemplary embodiment, a non-transitory computer readable medium is encoded with processor executable instructions that when executed by at least one processor, cause the at least one processor to carry out a method for protecting an electrical load 520 coupled to a drive system 500 as described herein, for example with reference to method 700.

It should be appreciated that acts associated with the described method 700, features, and functions (other than any described manual acts) may be carried out by one or more data processing systems, such as for example central control system 512, via operation of at least one processor 513. As used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the processor that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or or the like. Further, it should be appreciated that computer/ processor executable instructions may correspond to and/or may be generated from source code, byte code, runtime code, machine code, assembly language, Java, JavaScript, Python, Julia, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A drive system comprising:
a power converter comprising power modules supplying power to one or more output phases, each power cell comprising multiple switching devices,
a central control system in communication with the power converter and controlling operation of the power modules,
wherein the central control system comprises an advanced protection module, and at least one processor configured via executable instructions to
receive input data from an electrical load operably coupled to the one or more output phases utilizing power converter feedback from the electrical load,
determine one or more operating conditions of the electrical load based on the input data; and
output one or more protection parameters based on a determined operating condition of the electrical load for protecting the electrical load,
wherein the advanced protection module interfaces with a resistance temperature detector interface for receiving temperature input data associated with the electrical load, and
wherein the advanced protection module is further configured to utilize closed-loop hall effect current sensors and output attenuators to obtain accurate input data and to integrate the input data into algorithms of the advanced protection module.

2. The drive system of claim 1, wherein the resistance temperature detector interface comprises a programmable logic controller.

3. The drive system of claim 2, wherein the programmable logic controller is operably coupled to at least one temperature detector module and to a network switch for communicating with the central control system and the advanced protection module, the resistance temperature detector interface being integrated in the central control system of the drive system.

4. The drive system of claim 1, wherein the one or more protection parameters comprise predefined fixed levels and predefined variable levels.

5. The drive system of claim 4, wherein the one or more protection parameters include levels that are a function of a speed of the electrical load and/or that are based on a process curve of the drive system.

6. The drive system of claim 1, wherein the one or more operating conditions comprise a normal operating condition, an alarm setting operating condition and a fault setting operating condition of the electrical load.

7. The drive system of claim 4, wherein the central control system is further configured to control operation of the power converter and/or the electrical load within the predefined fixed levels and/or variable levels.

8. The drive system of claim 6, wherein the central control system is further configured to display the one or more operating conditions and associated protection parameters of the electrical load on a display.

9. The drive system of claim 1, the drive system being configured as medium voltage variable frequency drive and the electrical load being configured as medium voltage alternating current induction motor.

10. A method for protecting an electrical load of a drive system comprising through operation of at least one processor:
receiving input data from an electrical load coupled to one or more output phases of a power converter utilizing power converter feedback from the electrical load, wherein the input data include temperature data associated with the electrical load received via a resistance temperature detector interface,
determining one or more operating conditions of the electrical load based on the input data; and
outputting one or more protection parameters based on a determined operating condition of the electrical load for protecting the electrical load, and
utilizing closed-loop hall effect current sensors and output attenuators to obtain accurate input data of the electrical load.

11. The method of claim 10, further comprising through operation of the at least one processor:
controlling the power converter and/or electrical load according to the one or more output protection parameters.

12. The method of claim 10, further comprising:
displaying the determined operating condition and/or associated protection parameters on a display.

13. The method of claim 10, wherein the one or more protection parameters comprise predefined fixed levels and predefined variable levels.

14. The method of claim 13, wherein the one or more protection parameters include levels that are a function of a speed of the electrical load and/or that are based on a process curve of the drive system.

15. The method of claim 13, wherein a predefined fixed level is selected from a group of fixed over speed, fixed under speed, fixed under current, fixed under power, fixed torque pulsation, fixed negative sequence over current, fixed thermal overload, fixed resistance temperature detector (RTD) protection, fixed instantaneous over current, fixed zero sequence over voltage, fixed inverse time over current, fixed instantaneous zero sequence over voltage, fixed maximum power factor, fixed minimum power factor, fixed over frequency, fixed under frequency, fixed high frequency rate of change, and a combination thereof.

16. The method of claim 13, wherein a predefined variable level is dependent on a speed demand setting or other setting of the drive system.

17. The method of claim 16, wherein the predefined variable level is selected from a group of variable over speed, variable under speed, variable under current, variable thermal overload, variable over frequency, variable under frequency, and a combination thereof.

18. The method of claim 16, wherein the predefined variable thermal overload level includes thermal time constant(s) and/or maximum steady sate operating current to improve accuracy of thermal capacity used predictions.

19. A non-transitory computer readable medium encoded with processor executable instructions that when executed by at least one processor, cause the at least one processor to carry out a method for protecting an electrical load coupled to a drive system as claimed in claim 10.

* * * * *